United States Patent [19]

Gilson

[11] Patent Number: 5,380,439
[45] Date of Patent: Jan. 10, 1995

[54] SUBMERSIBLE BIOLOGICAL FILTER FOR THE PURIFICATION OF WASTE WATER

[75] Inventor: Robert Gilson, Tihange, Belgium

[73] Assignee: Cofido S.A., Leiege, Belgium

[21] Appl. No.: 809,529

[22] PCT Filed: Jul. 19, 1990

[86] PCT No.: PCT/BE90/00042

§ 371 Date: Mar. 19, 1992

§ 102(e) Date: Mar. 19, 1992

[87] PCT Pub. No.: WO91/01279

PCT Pub. Date: Feb. 7, 1991

[30] Foreign Application Priority Data

Jul. 20, 1989 [BE] Belgium ............... 8900789

[51] Int. Cl.⁶ .................................... C02F 3/10
[52] U.S. Cl. .................... 210/615; 210/150; 210/232; 261/94; 261/DIG. 72
[58] Field of Search ........... 210/615, 150, 151, 232; 261/DIG. 72, 94

[56] References Cited

U.S. PATENT DOCUMENTS

| | | | |
|---|---|---|---|
| 4,169,050 | 1/1979 | Serfling et al. | 210/615 |
| 4,303,600 | 12/1981 | Roe | 261/94 |
| 4,396,507 | 8/1983 | Grant | 261/DIG. 72 |
| 4,422,930 | 12/1983 | Hatanaka | 210/615 |
| 4,929,484 | 5/1990 | Basse | 210/615 |
| 5,160,395 | 11/1992 | Basse et al. | 210/615 |
| 5,168,058 | 12/1992 | Bohak et al. | 210/150 |
| 5,194,231 | 3/1993 | Gough et al. | 210/150 |

FOREIGN PATENT DOCUMENTS

| | | |
|---|---|---|
| 2565579 | 12/1985 | France . |
| 3110859 | 1/1982 | Germany . |
| 621263 | 1/1981 | Switzerland . |

OTHER PUBLICATIONS

Patent abstract of Japan, vol. 12, No. 482 (C-533) (3329), Dec. 15, 1988 & JP, A, 63197600 (Nishihara Environ. Sanit. Res. Corp.) Aug. 16, 1988.

Primary Examiner—Peter A. Hruskoci
Attorney, Agent, or Firm—Knobbe Martens Olson & Bear

[57] ABSTRACT

An immmersible biological filter apparatus and method for the purification of waste water is disclosed. The apparatus has bacterial supports comprising at least two holding members and an assembly of skeins, wherein each skein comprises bands of plastic material disposed in a spiral arrangement around and between said holding members, thereby providing a substantial filter surface area on said bands between said members, wherein said bands are essentially continuous.

20 Claims, 4 Drawing Sheets

SUBMERSIBLE BIOLOGICAL FILTER FOR THE PURIFICATION OF WASTE WATER

FIELD OF THE INVENTION

The invention relates to a "biological filter" whose enclosure can be submerged in the liquid to be treated.

Biological filters are used in particular for the treatment of waste water. These filters are in fact treatment vessels or basins comprising substrates or supports for bacteria beds involved essentially in the breakdown of the organic matter contained in the waste water.

TECHNICAL BACKGROUND

In biological filtration it is known to use various systems functioning aerobically or anaerobically, such as fixed or fluidised bacteria beds, biodiscs and activated sludge processes.

The document FR-A-2,565,579 has proposed an installation for the treatment of waste water by microorganisms, in which installation the treatment microorganisms are absorbed on glass fibres assembled in the manner of a cylindrical brush; they can be desorbed therefrom by mechanical action, which regenerates the treatment members.

The use of glass fibres and their assembly in the form of a cylindrical brush makes this type of installation costly, without any guarantee of easy accessibility to the bacteria bed formed.

The document DE-A-3,110,859 describes multiple-use devices, in particular for exchanges of materials, comprising spiralled plates.

The document CH-A-621,263 describes a device for treating liquids with gases, comprising a conduit containing metal shavings or plastic materials.

All these systems offer only a small fixation surface for the bacterial film relative to the weight of the support used, or they require heavy infrastructures. Their servicing in the event of blockage is difficult, given their great volume and their lack of internal accessibility.

AIMS OF THE INVENTION

The present invention aims to improve the surface available for the bacterial fixation and to reduce the cost of the infrastructures peripheral to the bacterial support, while at the same time providing easy accessibility for their servicing.

PRINCIPAL CHARACTERISTICS OF THE INVENTION

According to the present invention, the submersible biological filter for the purification of waste water is characterised in that it comprises, as bacterial support, an assembly of skeins of essentially continuous bands made of plastic material in a spiral arrangement around at least two holding members.

The assembly of the skeins of bands is used by charging it with a bacteria bed according to conventional techniques and by arranging it, by virtue of the holding members, in a basin for waste water treatment, preferably in several successive vertical planes.

The holding members advantageously are in the form of a frame which can be extracted with the skeins of bands with which it is lined.

In one basin it is possible to arrange, in parallel vertical planes, 3 to 10 frames of this type per running metre.

The bands forming the skeins are essentially continuous, that is to say they have a large length so that they can be arranged easily around the holding members which in principle only need to hold the bands at their ends.

Of course, an interruption may arise as a result of tearing or when the end of a reel is reached, and in this case an intermediate fixation on the holding member may be required.

According to another embodiment, it is preferable to ensure the fixation of the bands on the holding member by clipping on a longitudinally slotted tube of a diameter greater than the holding member.

The bands can be obtained from a bar of plastic material converted into continuous bands and spiralled by turning.

The bars of plastic material used are of any plastic material capable of giving a thin band, preferably by turning, by means of a cutting tool. The width of the band is in general a few tens of millimetres and its thickness is preferably several hundredths of a millimetre. Any other dimensions can be chosen without departing from the scope of the present invention.

It has been found that the technique of obtaining bands by turning a bar of plastic material by means of a cutting tool gives a non-smooth band which is particularly suited for obtaining the desired substrate.

It is conceivable for other techniques to be used for obtaining the bands, for example by cutting-out from films.

The bands can be manufactured by extrusion of the molten plastic material. A surface treatment of one or both faces may in some cases be carried out, with a view to modifying the surface state of the band.

The plastic materials used for obtaining the bands are chosen from among polyolefins, polyamides, polyesters, ABS or other copolymers. The plastic materials used are rigid, semi-rigid or flexible.

Use will preferably be made of a plastic material such as polyethylene or polypropylene, which gives semi-rigid bands which are particularly well suited for obtaining the skeins.

The skeins of bands can be obtained using any manufacturing technique.

In order to obtain the skeins, the bands are wound regularly onto holding members, which consist, for example, of tubular frames or other profiles, by rotating these bands around an axis of rotation situated preferably halfway between the holding members. Any other winding techniques can be used.

According to a particularly advantageous embodiment, it is possible, simultaneously to the spiralled winding onto the holding members, to twist the band about itself.

The lining of the frames can comprise a series of successive passes on one and the same section of the frame. The fixation of the bands on the spars of the frames is obtained by clipping, welding or any other fixation means. The frames are attached to the filter enclosure in a fixed or removable manner.

In principle, the bands have a width of 1 to 5 cm and are spiralled onto the frames at a rate of 1.5 to 3.5 spirals per running metre of frame.

It appeared expedient, in one advantageous embodiment of the invention, to provide an assembly of conduits bringing air (or another gas) under pressure into the skein of band in order to clean and unbunch the skeins of band.

Other features of the invention emerge from the following detailed description of an embodiment of the invention given by way of illustration and without limitation.

DESCRIPTION OF A PREFERRED EMBODIMENT OF THE INVENTION

The bands are obtained from a reel of polyethylene film of 0.03 mm in thickness and about 1,000 metres in length, which has been cut longitudinally in order to obtain bands of 20 mm in width.

Figure 1:
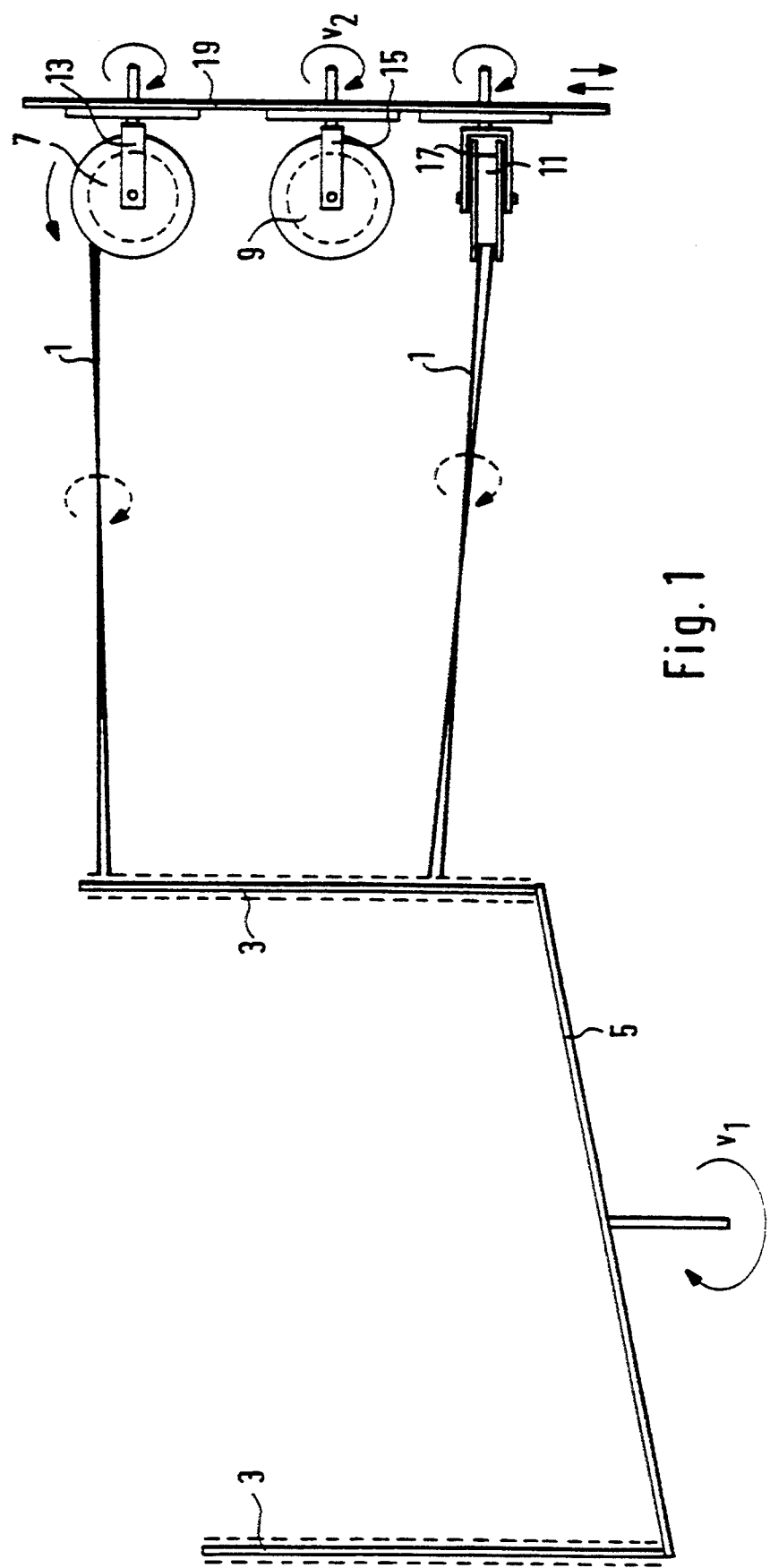
FIG. 1 shows a diagrammatic view of the system for winding the bands onto the holding members.

FIG. 1 shows a diagrammatic view of the system for winding the bands onto the holding members.

The bands (1) are wound onto two holding members (3) which are, in the present case, PVC tubes of 1 metre in length and 16 mm in diameter. These two members (3) are placed at the two ends, 1.1 m apart, of a rotating fork (5).

It is possible to wind simultaneously several bands coming from different reels (7, 9, 11) mounted on supports (13, 15, 17) integral with a common device (19) which executes a vertical displacement in order to wind the bands in a spiral around the holding members.

The supports (13, 15, 17) for the reels are additionally subjected to rotation in order to twist the band about itself before being wound around the holding members.

The speed of rotation v1 of the fork (5) and the speed of rotation v2 of the Supports (13, 15, 17) for the various reels are regulated in order to obtain 1.5 to 2.5 spirals per running metre of band.

Figure 2:
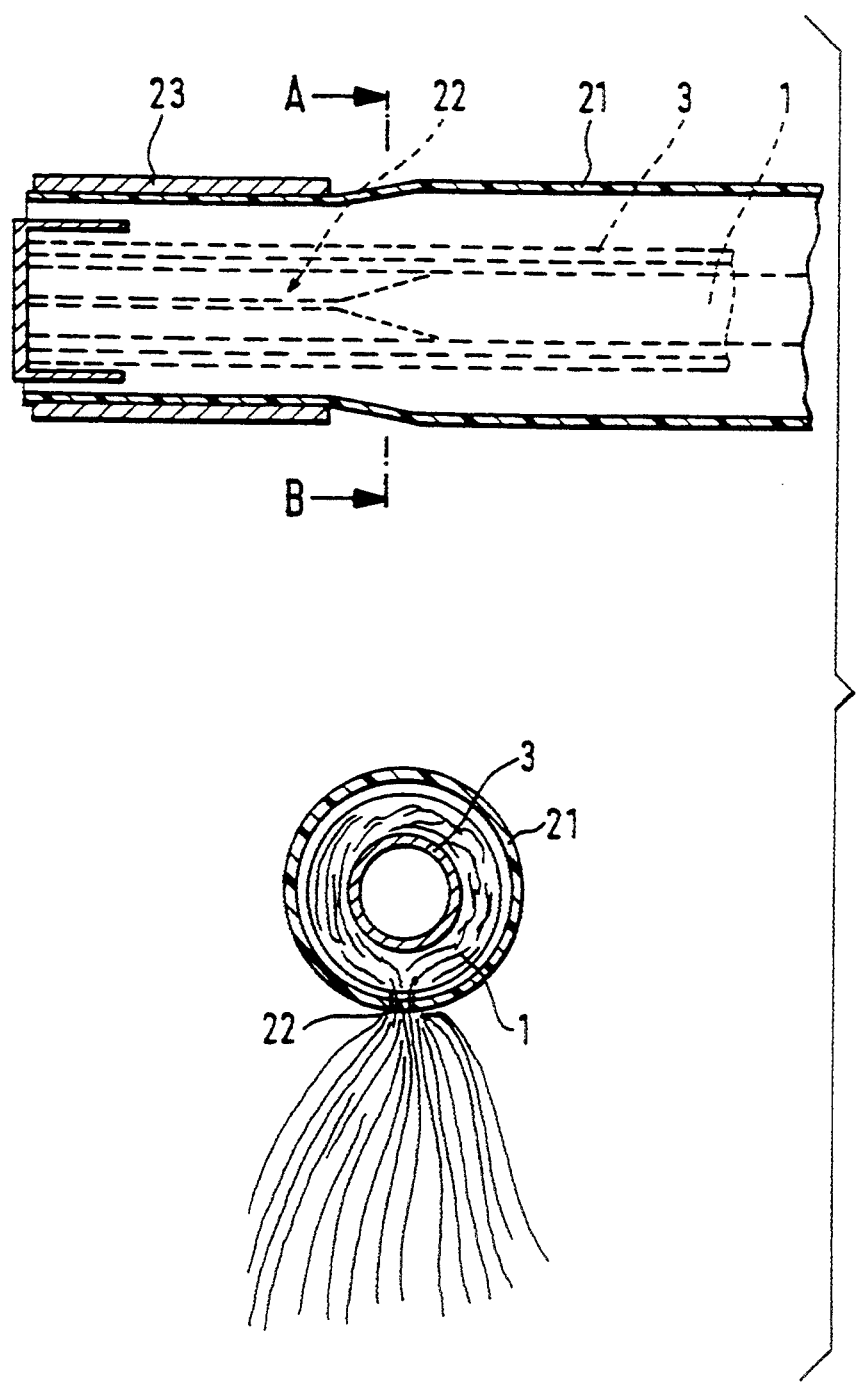
FIG. 2 shows a longitudinal cutaway view and a transverse cutaway view of the holding members.

FIG. 2 shows a longitudinal cutaway view and a transverse cutaway view of the holding members.

After the desired quantity of band has been wound onto the holding members, the fixation of the band (1) on these members (3) is ensured by clipping on a PVC tube (21) slotted (22) over its entire length and of a diameter greater than that of the holding member (3). The passage of a ring (23) of a diameter smaller than that of the tube (21) clipped on at each end conclusively secures the bands in manipulable skeins.

After the bands have been wound and fixed onto the two holding members (3), the latter are detached from the rotating fork (5).

A withdrawal of about 10% of the bands when the skeins are released from the winding fork must be taken into consideration. This is due to the tensioning of the bands during the unwinding of the reels when the operation is being carried out with polyethylene.

A second effect of the release from the winding forks is that of giving the skeins greater thickness, the turns of the bands organising themselves to form a "cushion".

Figure 3:
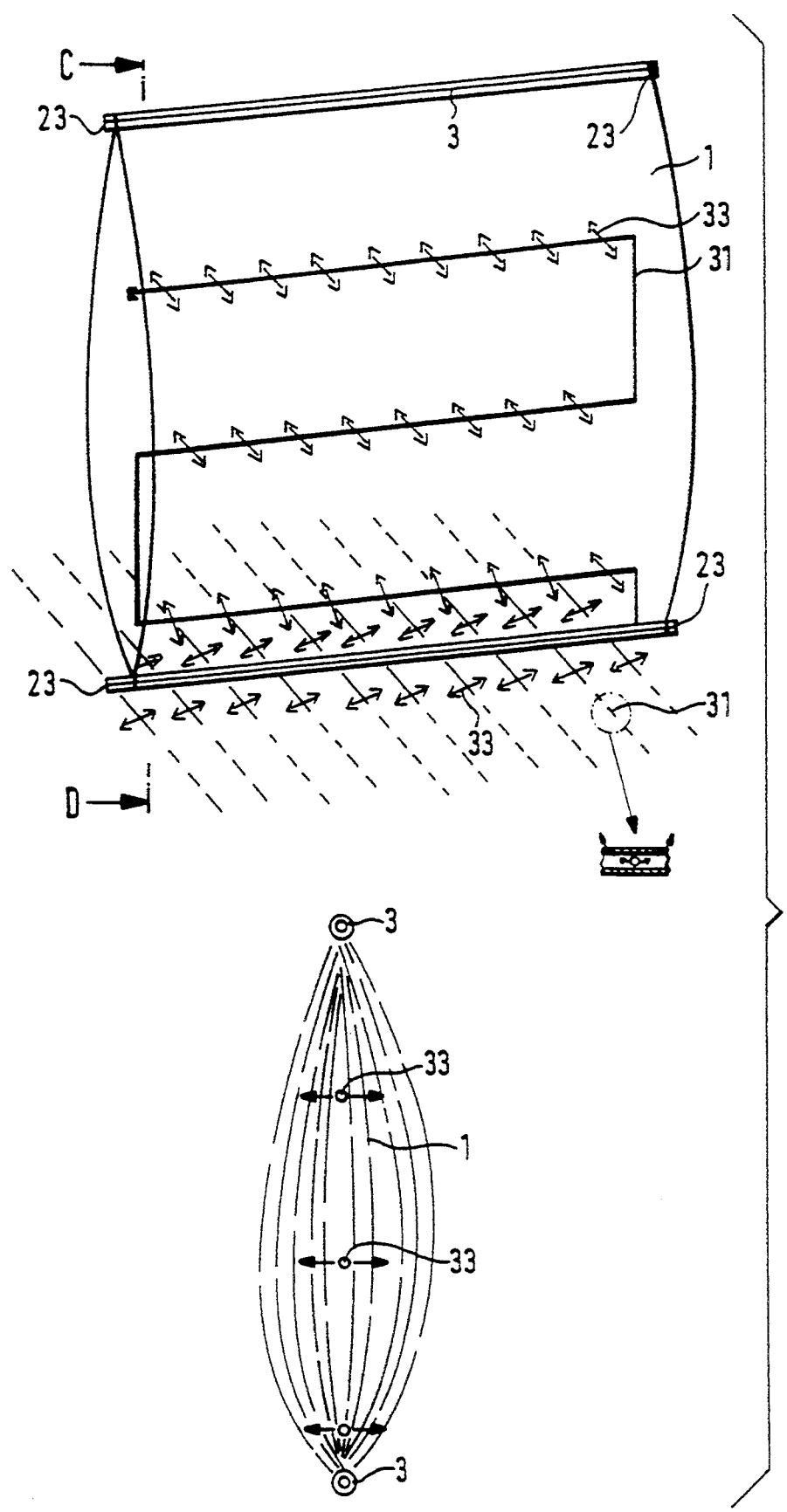
FIG. 3 shows a perspective view and a frontal cutaway view of a skein of band ready to be positioned in a biological filter module.

FIG. 3 shows a perspective view and a frontal cutaway view of a skein of band ready to be positioned in a filter module.

The connection members are placed horizontally in the bottom and at the top of the module in such a way that the skeins are positioned in an essentially vertical manner.

By way of illustration there follows an exemplary embodiment of a skein.

A skein of 1 $m^2$ can be formed with 5 reels of band of 1,000 m in length, 2 cm in width and 0.03 mm in thickness.

This skein then consists, for each face, of 100 running $m^2$ of support to which the bacterial flora can attach, that is to say, in total, one skein provides 200 $m^2$ of support.

If 10 skeins such as described above are placed in a filter of 1 $m^3$ (cubic caisson with 1 m edge), the bacterial support (bands):

weighs 30 kg
takes up 3% of the volume
offers ±2,000 $m^2$ of surface for attachment of the bacterial flora per $m^3$, whereas the best results according to the prior art permit only 250 $m^2$ of support per $m^3$ to be obtained.

The skeins according to the present invention advantageously make it possible to obtain a very considerable support surface for the bacterial flora, while at the same time taking up only a small volume (3%).

Cutting the plastic masses into thin bands optimises the surface offered per unit of weight of material used compared to the other known systems.

In order to facilitate the cleaning and the unbunching (moving the excess bacterial flora) in the biological filter module, a device has been provided consisting of pipes (31) bringing pulsated air to the centre and/or under the skeins.

Lateral perforations (33) are provided in the pipes in order to eject the pulsated air into the skeins.

Figure 4:
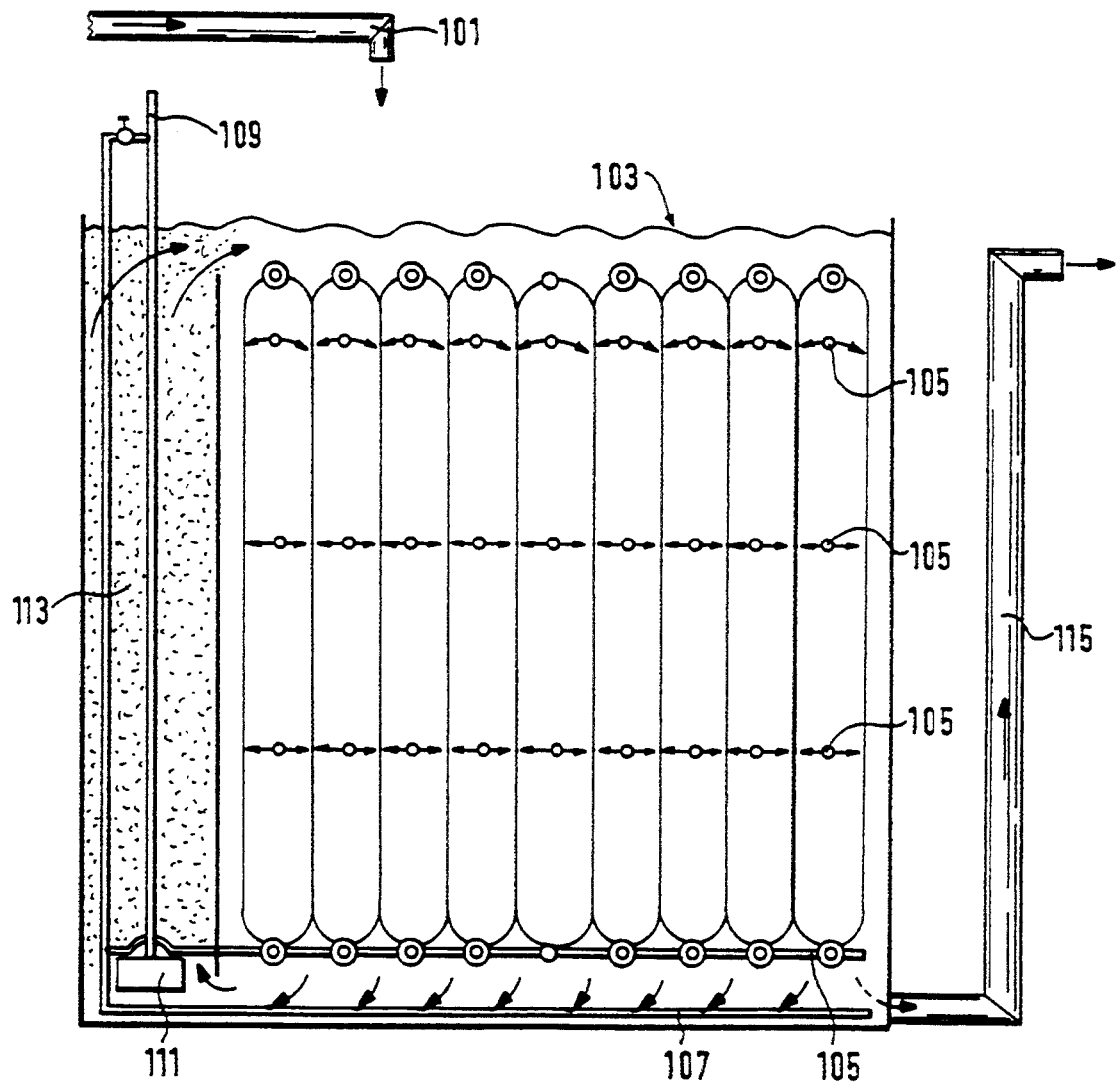
FIG. 4 shows a cutaway view of a biological filter module.

FIG. 4 shows a cutaway view of a biological filter module consisting of a cube with a one metre edge, in which there are arranged 9 skeins equipped with 3 kg of bands per skein.

The waste water is conveyed (at 101) and poured into the tank constituting the biological filter. The skeins (103) are arranged vertically.

The cleaning and unbunching of the zones inside the skeins is ensured by a distribution of pulsated air coming from perforated tubes (105) situated inside the skeins, while the cleaning and unbunching of the zones outside these skeins is effected by means of pulsated air coming from perforated pipes (107) placed below the said skeins.

On the pulsated-air supply line (109) there is a branch for pulsated air intended for the cleaning devices.

The oxygen necessary for the bacterial flora also comes from the pulsated-air supply line and is conveyed towards a diffuser (111) where this oxygen diffuses towards an oxygenation column (113).

The purified water is removed (at 115) and a decanter may optionally be provided.

The materials used both for producing the support and the enclosure containing the latter make it possible to render the assembly submersible and buoyant, in view of their specific gravity close to unity.

The skeins can also serve as a lining in the basins of conventional biological filters. The service life is long, given the non-biodegradability of the materials chosen for use.

The orientation of the bands favours the removal of the activated sludge particles and makes it easy to penetrate into the lining, in the event of blockage, via conventional cleaning systems.

This biological filter system can be supplied with air and water by all conventional processes and can function aerobically or anaerobically.

NUMERICAL EXAMPLE

A biological filter module of 1 m$^3$ made up of 9 skeins of 200 m$^2$, i.e. 1,800 m$^2$/m$^3$ of support surface for attachment of the bacterial flora, gives the following results:

The total volume of the filter varies with the type of oxygenation chosen, for example pulsated-air system, surface emulsifier, jet pump (venturi), liquid oxygen, etc.

In this example we have used the integral pulsated-air technique (for the oxygenation, recycling and cleaning-/unbunching).

The raw water flow rate is 10 1/min or 14.4 m$^3$/day. It should be noted that 14.4 m$^3$/day corresponds to 80 or 96 population equivalents by volume, depending on whether the accepted norm is 150 or 180 1/day p.e.

The level of O$_2$ under the bands is maintained between 1.5 and 3.2 ppm by modulating the air flow rate.

The temperature varies between 12° and 14° C.
The results are:
Mean COD at intake: 482 mg of O$_2$
Mean COD at discharge: 68 mg O$_2$
The efficiency is then $$\frac{482 - 68}{482} = 85.9\%$$

The successive use of modules in series makes it possible to reduce the COD to below the norms recommended in waste water treatment regulations.

I claim:

1. A biological filter apparatus for the purification of waste water having bacterial supports, said supports comprising:
   at least two holding members;
   an assembly of skeins, wherein each of said skeins comprises bands of plastic material disposed in a spiral arrangement around and between said holding members, thereby providing a substantial filter surface area on said bands between said members, wherein said bands are essentially continuous; and
   a perforated conduit situated inside said skeins for delivering gas to aid skeins in order to clean and/or unbunch said skeins.

2. An apparatus, as claimed in claim 1, wherein said holding members form a frame for said skeins, and said frame is removably mounted in said vessel.

3. An apparatus, as claimed in claim 2, wherein from 3 to 10 frames per meter are positioned with said skeins in substantially parallel vertical planes.

4. An apparatus, as claimed in claim 1, further comprising a retaining tube for retaining said bands on said holding members having an internal diameter greater than the external diameter of said members and having a longitudinal slot therein, said retaining tube being slidably mounted on said member with said bands passing through said slot.

5. An apparatus, as claimed in claim 1, wherein said bands are cut from a block of plastic material.

6. An apparatus, as claimed in claim 1, wherein said bands are cut from plastic film.

7. An apparatus, as claimed in claim 1, wherein said plastic material is selected from the group consisting of polyolefins, polyamides, polyesters, and acrylonitrile-butadiene-styrene (ABS).

8. An apparatus, as claimed in claim 1, wherein said bands have a width of from about 1 cm to about 5 cm and are spiralled onto said holding members at a rate of from about 1.5 to about 3.5 spirals per running meter of said said holding members.

9. An apparatus, as claimed in claim 1, further comprising a vessel, in which said supports are disposed, said vessel having:
   means for conveying waste water thereto;
   means for removing purified water therefrom; and
   means for supplying oxygen thereto.

10. An apparatus, as claimed in claim 1, wherein said bands are twisted about themselves between said holding members.

11. An apparatus, as claimed in claim 1, wherein said holding members comprise a pair of elongate tubes and said supports are arranged so that each pair of said tubes are substantially parallel to one another.

12. A bacterial support for a biological filter apparatus, comprising:
   at least two holding members;
   a skein comprising bands of plastic material disposed in a spiral arrangement around and between said holding members, thereby providing a substantial filter surface area between said members, wherein said hands are essentially continuous; and
   a perforated conduit situated inside said skein for delivering gas to said skein in order to clean and/or unbunch said skein.

13. A bacterial support, as claimed in claim 12, wherein said members comprise a pair of elongate tubes and said supports are arranged so that each pair of said tubes are substantially parallel to one another.

14. A bacterial support, as claimed in claim 12, further comprising a retaining tube for retaining said bands on said holding members having an internal diameter greater than the external diameter of said members and having a longitudinal slot therein, said retaining tube being slidably mounted on said member with said bands passing through said slot.

15. A bacterial support, as claimed in claim 12, wherein said bands are twisted about themselves between said support members.

16. A bacterial support, as claimed in claim 12, wherein said bands are cut from a block of plastic material.

17. A bacterial support, as claimed in claim 12, wherein said bands are cut from plastic film.

18. A bacterial support, as claimed in claim 12, wherein said plastic is selected from the group consisting of polyolefins, polyamides, polyesters and acrylonitrile-butadiene-styrene (ABS).

19. A bacterial support, as claimed in claim 12, wherein said bands have a width of from about 1 cm to about 5 cm and are spiralled onto said holding members at a rate of from about 1.5 to about 3.5 spirals per running meter of said holding members.

20. A method of treating waste water which comprises the steps of:
   a) charging an apparatus having bacterial supports with bacteria, said supports comprising:
      at least two holding members;
      an assembly of skeins, wherein each of said skeins comprises bands of plastic material disposed in a spiral arrangement around and between said holding members, thereby providing a substantial filter surface area on said bands between said members, wherein said bands are essentially continuous; and a perforated conduit situated inside said skeins of said bacteria supports for delivering gas to said skeins;

b) supplying waste water to said bacterial supports; and c) bringing a gas under pressure through said perforated conduit into said skeins of said bacterial supports in order to clean and/or unbunch said skeins.

* * * * *

UNITED STATES PATENT AND TRADEMARK OFFICE
CERTIFICATE OF CORRECTION

PATENT NO. : 5,380,439
DATED : January 10, 1995
INVENTOR(S) : Robert Gilson

It is certified that error appears in the above-indentified patent and that said Letters Patent is hereby corrected as shown below:

On the title page, item [73], change "Leiege" to --Liege--.

Signed and Sealed this

Fourteenth Day of May, 1996

Attest:

BRUCE LEHMAN

Attesting Officer        Commissioner of Patents and Trademarks